United States Patent
Still et al.

(10) Patent No.: US 6,659,549 B1
(45) Date of Patent: Dec. 9, 2003

(54) SEAT SENSOR AND METHOD FOR INSTALLING THE SAME

(75) Inventors: Charles A. Still, Clinton, MI (US); Richard W. Wang, West Bloomfield, MI (US); Curtis L. Williams, Brighton, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/677,246

(22) Filed: Oct. 2, 2000

(51) Int. Cl.[7] ............................................. A47C 31/00
(52) U.S. Cl. ............................ 297/217.3; 297/452.26; 340/667
(58) Field of Search ......................... 297/217.3, 180.12, 297/180.1, 452.26; 340/667

(56) References Cited

U.S. PATENT DOCUMENTS

| | | | | |
|---|---|---|---|---|
| 4,695,091 A | * | 9/1987 | Altmann et al. | 297/180.12 |
| 4,865,379 A | * | 9/1989 | Aoki et al. | 297/180.12 |
| 6,179,378 B1 | * | 1/2001 | Baumgartner et al. | 297/180.12 |
| 6,371,552 B1 | * | 4/2002 | Narita et al. | 297/180.12 |
| 6,428,095 B1 | * | 8/2002 | Hirata | 297/217.3 |

* cited by examiner

*Primary Examiner*—Anthony D. Barfield
(74) *Attorney, Agent, or Firm*—Sally J. Brown; James D. Erickson

(57) ABSTRACT

A seat sensor 10 including a pressure sensing mat 12, and several barbed members or tabs 14 which are integrally formed within sensing mat 12. Sensor 10 is adapted to be operatively installed on a conventional vehicle seat. In order to install sensor 10, several holes or cavities 20 are formed within the foam 22 of the seat in a conventional manner prior to assembly, and tabs 14 are forced into cavities 20. Once tabs 14 are inserted into cavities 20, barbed portions 18 "spring" outward against the sides of the cavities 20, thereby frictionally engaging and/or piercing the sides of the cavities 20 and securing seat sensor 10 to the seat.

7 Claims, 1 Drawing Sheet

SEAT SENSOR AND METHOD FOR INSTALLING THE SAME

FIELD OF THE INVENTION

This invention relates to a seat sensor and a method for installing the same and more particularly, to a seat sensor which is adapted to be relatively easily and securely installed on a vehicle seat.

BACKGROUND OF THE INVENTION

Seat sensors are used within automotive vehicles to determine whether occupants are currently residing in the various seats of the vehicle. These seat sensors typically communicate signals describing vehicle occupant information (e.g., describing which seats are currently occupied) to a controller, such as a vehicle control unit, which receives the signals and utilizes the vehicle occupant information to engage in or to refrain from taking certain actions.

These prior seat sensors are typically placed on the seat foam or cushion during the assembly of the seat by use of attachment devices such as "double-sided" tape or Velcro. One drawback associated with these types of seat sensors and attachment methods is that they often become disengaged after use, causing the sensor to move relative to the seat foam or cushion. This displacement of the sensor may adversely effect the sensor's ability to detect occupants within the vehicle seat. Moreover, the use of these attachment devices unnecessarily increases the cost of the sensor and the time required to mount the sensor onto the seat.

There is therefore a need for a new and improved seat sensor which overcomes many, if not all, of the previously delineated drawbacks of prior seat sensors.

SUMMARY OF THE INVENTION

It is a first object of the invention to provide a seat sensor which overcomes at least some of the previously delineated drawbacks of prior seat sensors and a method for installing such a seat sensor on a vehicle seat.

It is a second object of the invention to provide a seat sensor for use with a vehicle seat which detects the presence of an occupant within the vehicle seat and a method for installing such a seat sensor on a vehicle seat.

It is a third object of the invention to provide a seat sensor which is adapted to be easily and securely coupled to a vehicle seat without the use of extraneous attachment devices.

According to a first aspect of the invention, a seat sensor is provided for use with a seat of the type that includes an amount of seat foam having at least one cavity. The seat sensor includes a sensor portion having at least one integrally formed tab portion which is adapted to be selectively and deformably inserted into the cavity, thereby engaging the seat foam and securely holding the seat sensor on the seat.

According to a second aspect of the present invention, a method is provided for securing a sensor mat to a seat having an amount of foam padding. The method includes the steps of integrally forming at least one barbed tab portion within the sensor mat; forming at least one hole within the amount of foam padding; positioning the at least one barbed tab portion over the at least one hole; and forcing the at least one barbed tab portion into the at least one hole, effective to deform the barbed tab portion and causing the barbed tab portion to engage the foam padding, thereby securing the sensor mat to the seat.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
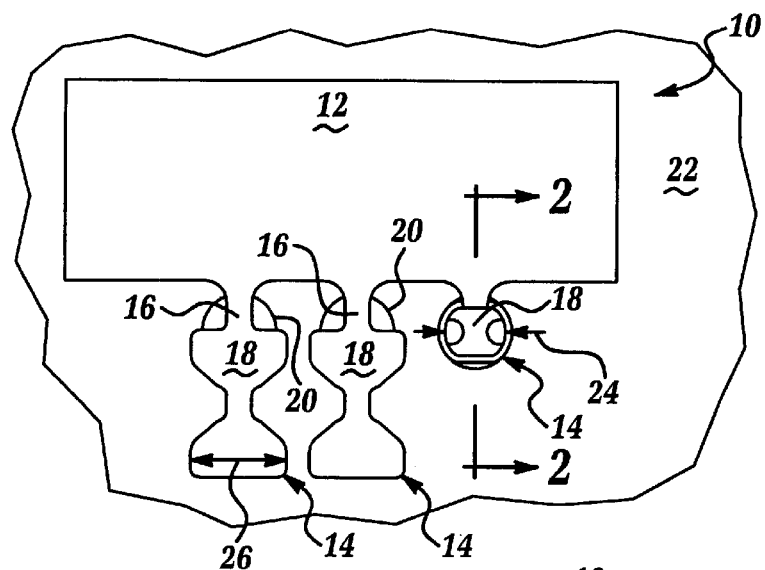
FIG. 1 is a top view of a seat sensor assembly which is made in accordance with the teachings of the preferred embodiment of the present invention, and which adapted for use with a vehicle seat.

Referring now to FIG. 1, there is shown a seat sensor assembly 10 which is made in accordance with the teachings of the preferred embodiment of the present invention, and which is adapted for use with a vehicle seat. Seat sensor assembly 10 is a relatively thin, flat polymer device which includes a generally flat pressure sensing portion or sensor mat 12, and several barbed members or tabs 14 which are integrally formed with sensor mat 12 and which project from sensor mat 12. In the preferred embodiment, sensor 10 is made from commercially available polyethylene teraphtalate or "PET" substrate material. Pressure sensing portion 12 is generally rectangular and is adapted to be disposed on a vehicle seat. Portion 12 includes one or more pressure sensing circuits or elements, which are effective to sense pressure applied to portion 12, such as the pressure imparted by an individual sitting on the seat or by placing an object on the seat, and to generate one or more electrical signals in response to such a pressure detection. Portion 12 may be conventionally and communicatively coupled to a controller (e.g., an engine control unit) or other device which receives the generated signals and takes one or more actions in response to the received signals.

Figure 3:
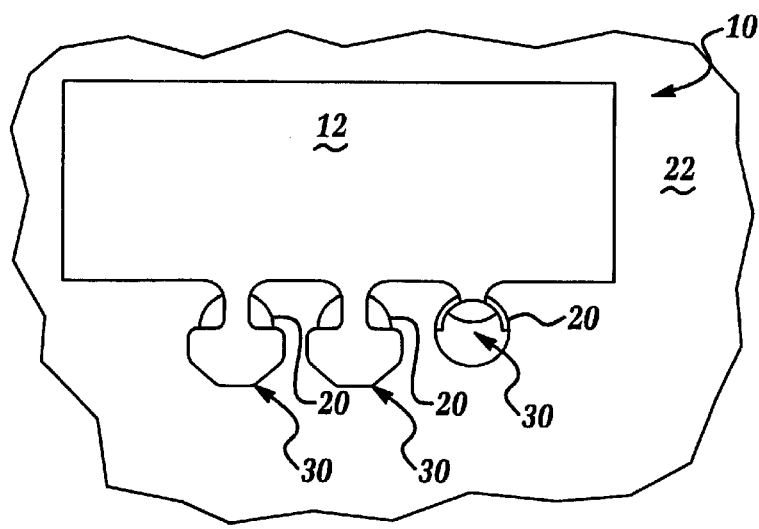
FIG. 3 is a top view of a seat sensor assembly which is made in accordance with the teachings of an alternate embodiment of the present invention.

In the preferred embodiment, barbed members or tabs 14 are punched or otherwise formed from resilient non-functional regions of the sensor portion 12. Tabs 14 include a generally narrow stem portion 16 and polygonal shaped barbed portions 18. In the preferred embodiment, sensor assembly 10 utilizes "double" barbed tabs 14. In alternate embodiments, such as the embodiment shown in FIG. 3, sensor 10 utilizes "single" barbed tabs 30. In other alternate embodiments, sensor assembly 10 may employ various other combinations, shapes and/or varieties of tabs 14, 30.

Sensor assembly 10 is adapted to be operatively installed on a conventional vehicle seat. In order to install sensor 10, several holes or cavities 20 are formed within the foam 22 of the seat in a conventional manner prior to assembly (e.g., by molding or punching). In the preferred embodiment, cavities 20 are generally circular in shape and have a diameter 24 which is smaller than the width 26 of barbed portions 18.

Figure 2:
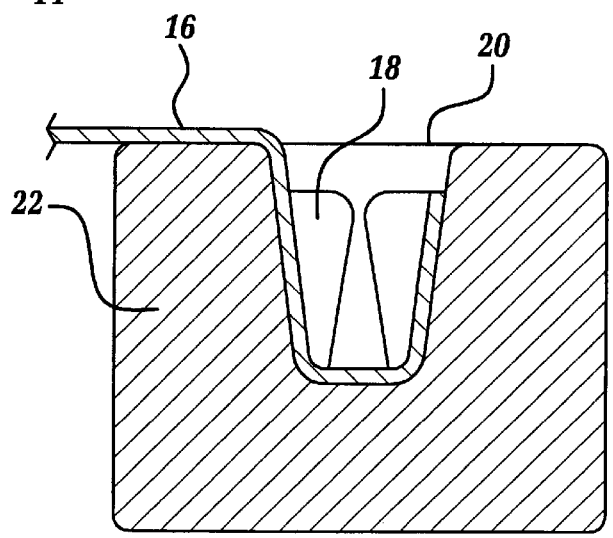
FIG. 2 is a sectional view of a vehicle seat illustrating the attachment of the sensor assembly shown in FIG. 1 to the vehicle seat.

Sensor assembly 10 is placed on the seat foam or padding 22 and tab members 14 are respectively aligned with and/or positioned over apertures 20, as shown in FIG. 1. The tab members 14 are then pushed and/or bent downward into apertures 20. As tab members 14 are inserted into apertures 20, barbed portions 18 are deformed or compressed to fit within apertures 20. Once inserted into apertures 20, barbed portions 18 "spring" outward against the sides of the apertures 20, thereby frictionally engaging and/or piercing the sides of the apertures 20 and retaining the tabs 14 within apertures 20, as shown best in FIG. 2. In this manner, tabs 14 securely hold the sensor assembly 10 in place on the seat foam 22. The foregoing installation method and novel integral tab features of sensor 10 provide a relatively simple and secure method of retaining sensor assembly 10 on a vehicle seat without the use of extraneous attachment devices. Once the sensor installation procedure is completed, sensor assembly 10 will be effective to detect pressure imparted upon the seat, thereby allowing for the detection of occupants or objects within the seats of a vehicle.

It is to be understood that the invention is not to be limited to the exact construction and/or method which has been illustrated and discussed above, but that various changes and/or modifications may be made without departing from the spirit and scope of the invention.

What is claimed is:

1. A seat sensor in combination with a seat of the type including an amount of seat foam having at least one cavity, and comprising a sensor portion having at least one integrally formed tab portion which is adapted to be selectively and deformably inserted into said at least one cavity, thereby engaging said seat foam and securely holding said seat sensor on said seat.

2. The seat sensor of claim 1 wherein said sensor portion and said at least one integrally formed tab are made from a resilient polymeric material.

3. The seat sensor of claim 1 wherein said at least one integrally formed tab comprises a barbed portion which frictionally engages said seat foam.

4. The seat sensor of claim 3 wherein said barbed portion is polygonal in shape.

5. The seat sensor of claim 1 wherein said at least one integrally formed tab comprises a double barbed portion.

6. The seat sensor of claim 1 wherein said sensor portion is effective to detect an occupant sitting in said seat.

7. The seat sensor of claim 1 wherein said sensor portion comprises a polymeric sensor mat and wherein said at least one integrally formed tab is formed from non-functional portions of said polymeric sensor mat.

* * * * *